United States Patent [19]

Coons, Jr.

[11] Patent Number: 4,690,392

[45] Date of Patent: Sep. 1, 1987

[54] ENVELOPE CONFIGURATION FOR USE IN A HIGH SPEED COPIER WITH ENVELOPE PRINTING CAPABILITY

[75] Inventor: Robert A. Coons, Jr., Holcomb, N.Y.

[73] Assignee: Xerox Corporation, Stamford, Conn.

[21] Appl. No.: 780,866

[22] Filed: Sep. 27, 1985

Related U.S. Application Data

[63] Continuation of Ser. No. 653,408, Sep. 24, 1984, abandoned.

[51] Int. Cl.$^{4}$ .......................... B65H 5/00; G03B 15/00

[52] U.S. Cl. .......................................... 271/2; 271/10; 271/109; 355/3 SH

[58] Field of Search .......................... 229/68 R, 80, 71; 271/2, 10, 109, 9, 65; 355/3 SH, 14 SH

[56] References Cited

U.S. PATENT DOCUMENTS

| | | | |
|---|---|---|---|
| 914,274 | 3/1909 | Heyer | 228/68 R |
| 3,420,433 | 8/1967 | Bostwick | 229/80 |
| 3,627,195 | 12/1971 | Hauer | 229/68 R |
| 3,666,926 | 5/1972 | Conte, Jr. et al. | 235/487 |
| 4,004,728 | 1/1977 | Ryan et al. | 229/76 |
| 4,308,988 | 1/1982 | Jiveman et al. | 229/80 |

FOREIGN PATENT DOCUMENTS

| | | | |
|---|---|---|---|
| 0165645 | 12/1981 | Japan | 271/10 |
| 0022830 | 2/1984 | Japan | 271/10 |
| 2126991 | 4/1984 | United Kingdom | 271/10 |

*Primary Examiner*—Joseph J. Rolla
*Assistant Examiner*—Gregory L. Huson
*Attorney, Agent, or Firm*—Bernard A. Chiama

[57] ABSTRACT

An envelope construction for use in a copy sheet feeding apparatus of a copying machine. The envelope having panels which, before closure and sealing, have only two overlapping layers of material and straight side edges which are equal to or greater than the distance the envelopes travel while being guided in the sheet feeding apparatus and before entering the transport system for the copying machine.

2 Claims, 5 Drawing Figures

ENVELOPE CONFIGURATION FOR USE IN A HIGH SPEED COPIER WITH ENVELOPE PRINTING CAPABILITY

This is a continuation of application Ser. No. 653,408, filed Sept. 24, 1984 now abandoned.

This invention relates to an envelope construction for use in a high productivity reproduction system, or copying machine, having an arrangement permitting the feeding of blank envelopes from a supply and into the coping machine processor.

With the advent of more sophisticated and, therefore, more costly copy producing machines, printing presses, and the like, considerations as to uses in addition to the production of copy sheets has assumed increasing importance. One of the possible additional uses for copiers is for the printing of business envelopes from blanks with such information as sendee and return addresses, and postage information. However, copiers or duplicators presently on the market are not adapted to process blank envelopes because most conventional business envelopes either have portions with three or more layers of material and/or the shape of some envelope parts do not lend themselves to permitting the envelopes to be separated and fed from a supply stack or through the printing machine registration and transport system.

Envelopes which have portions of three or more overlapped layers of material are affected when passing through the toner image fixing apparatus of the type having a heated roller and a backup pressure roller. In this type of fixing apparatus, the rollers are spaced apart to handle a predetermined range of paper thicknesses in order to insure quality fixing. Two thicknesses of sheets may be tolerated but three thicknesses have, in practice, resulted in deterioration in quality, smudging of toner images, and physical damage such as wrinkling on those portions of the envelope whereat three layers of paper were present. In addition, generally business envelopes are shaped as to include tapers on their sealing flaps wherein the tapers are of an angle which renders the envelope unadaptable to be fed by copy sheet feeders in present day copiers, nor to be conveyed through the transport systems in the copier, or to be properly registered.

Typical envelopes in use are of the type disclosed in U.S. Pat. Nos. 914,274; 3,627,195; 3,666,926; and 4,004,728, which either disclose envelopes having three or more overlapped layers of materials, such as U.S. Pat. Nos. 3,627,195 and 4,004,728, or are of two layer material but are not suited or configured to be utilized with copier sheet feeding operation, such as, the envelopes disclosed in U.S. Pat. Nos. 914,274 and 3,666,926.

The present invention is a specially constructed envelope devised to be fed from a supply stack placed in the conventional copy sheet feeder apparatus so that the copier may be utilized, as one of its application features, for the printing on envelopes. The envelope, in accordance with the present invention, is configured so that a conventional copier sheet feeder is adapted to separate the envelope from a stack, to direct the same to and through sheet transport devices in the copier, and to lend itself to be registered by any one of a number of types of registration devices.

The present invention then provides a secondary use for conventional copiers, that of printing envelopes. This is accomplished without any modification to the copier. A stack of envelopes constructed in accordance with the present invention may be placed upon the elevator platform for the copier and applied directly to the associated sheet feeder.

The present invention is particularly adapted for laser printers which utilize electronic input for imaging on a suitable photoreceptor of a copy machine. The electronic data may be varied for successive images representing addresses to be printed on successive envelopes. Another printing job may just require many thousands of printed envelopes bearing the same printed matter such as self-addressed, return envelopes. In this application instead of a laser input, the copier document platen may be utilized for supporting an original comprising the information to be printed and the use of optical scanning or flash exposure.

Other objects and advantages will be apparent from the ensuing description and drawings in which.

Figure 1:
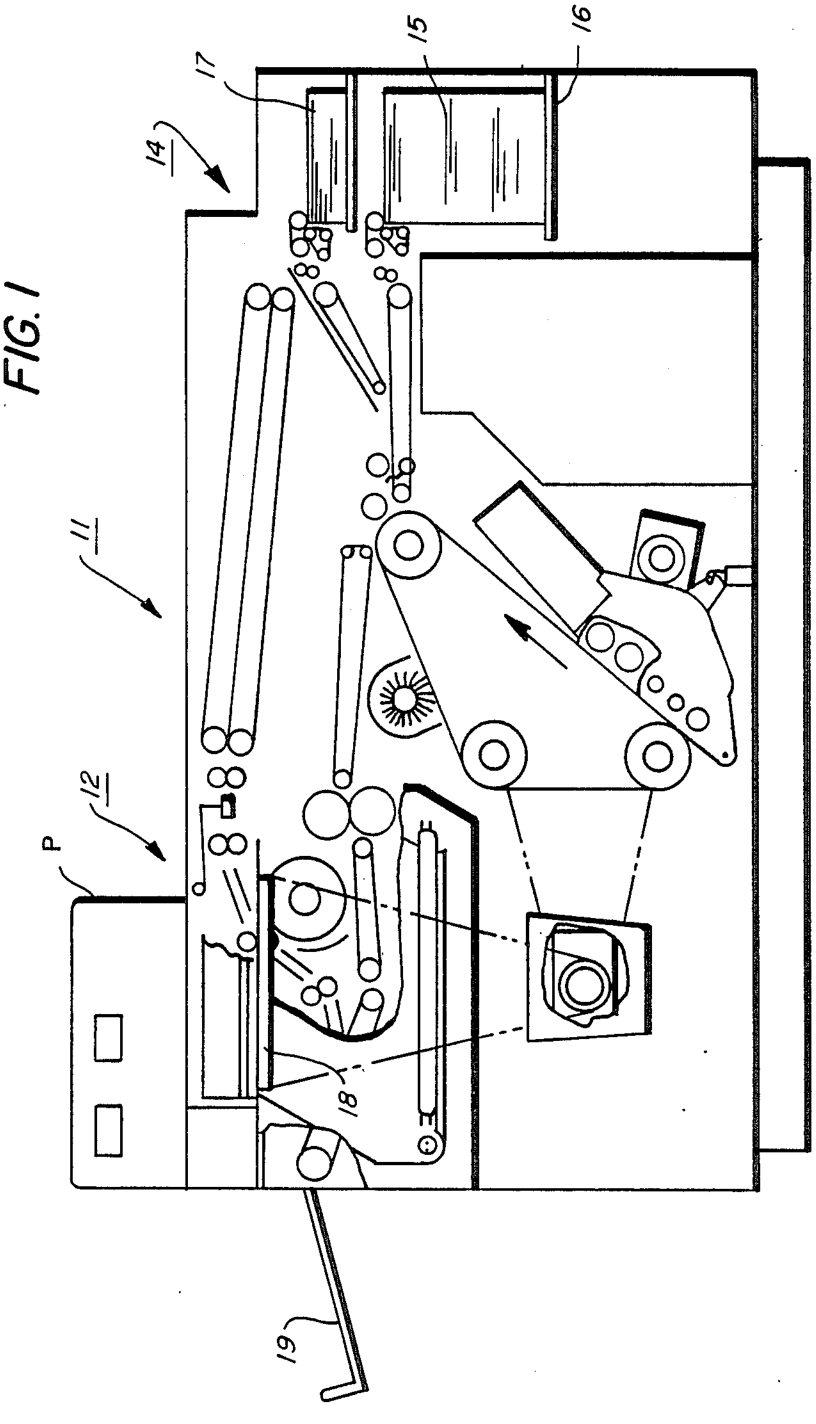
FIG. 1 is a schematic illustration of a configuration of an electrostatographic printing system to which the present invention may be utilized.

For a general understanding of a reproduction or copying machine with which the present invention may be incorporated, reference is made to FIG. 1 wherein components of a typical electrostatic printing system are illustrated. The printing system is preferably of the xerographic type as one including a xerographic processor 11, and a document handling apparatus 12. Preferably, the processor 11 is the same as the processor in the commerical embodiment of the Xerox duplicators, models 9400® and 9500® which utilize flash, full frame exposure, for very high speed production. Similarly, the document handling apparatus 12 is the same as those used in the same machines. It will be understood that most any other type of xerographic processor and multiple exposure document handling apparatus may be utilized. It is understood that any other type of printing machine may incorporate or use the present invention.

The system comprising the processor 11 and the document handling apparatus 12 is under control of a programmer P which permits an operator various options: to turn the entire system ON or OFF; to program the reproduction system for a desired number of reproductions to be made of each original document sheet; to select whether simplex or duplex copies are to be made; to select one of a plurality of paper trays; to condition the machine for the type of document, that is, whether one sided or two sided, to select a copy size reduction mode, and other desirable functions. The programmer P also includes a controller which provides all operational timing and synchronization between the processor 11 and all of its zerographic processing functions, and system control functions, the automatic events to be described hereinafter. The controller may include any suitable microprocessor having a CPU and the appropriate machine clock, but preferably the processor is one similar to the Intel 8080 microprocessor manufactured by the Intel Corporation, Santa Clara, Calif., and having sufficient ROM's and RAM's for all the necessary functions in the reproduction system.

The copier/duplicator system shown in FIG. 1 is representative of systems which are capable of producing 120 and more image impressions per minute. For simplex or one sided copying, this can result in producing 120 copies per minute or more. In order to accomplish fairly long reproduction runs, the main copy sheet supply subsystem for the system, the main copy sheet holding tray is adapted to hold five reams of sheets.

Figure 2:
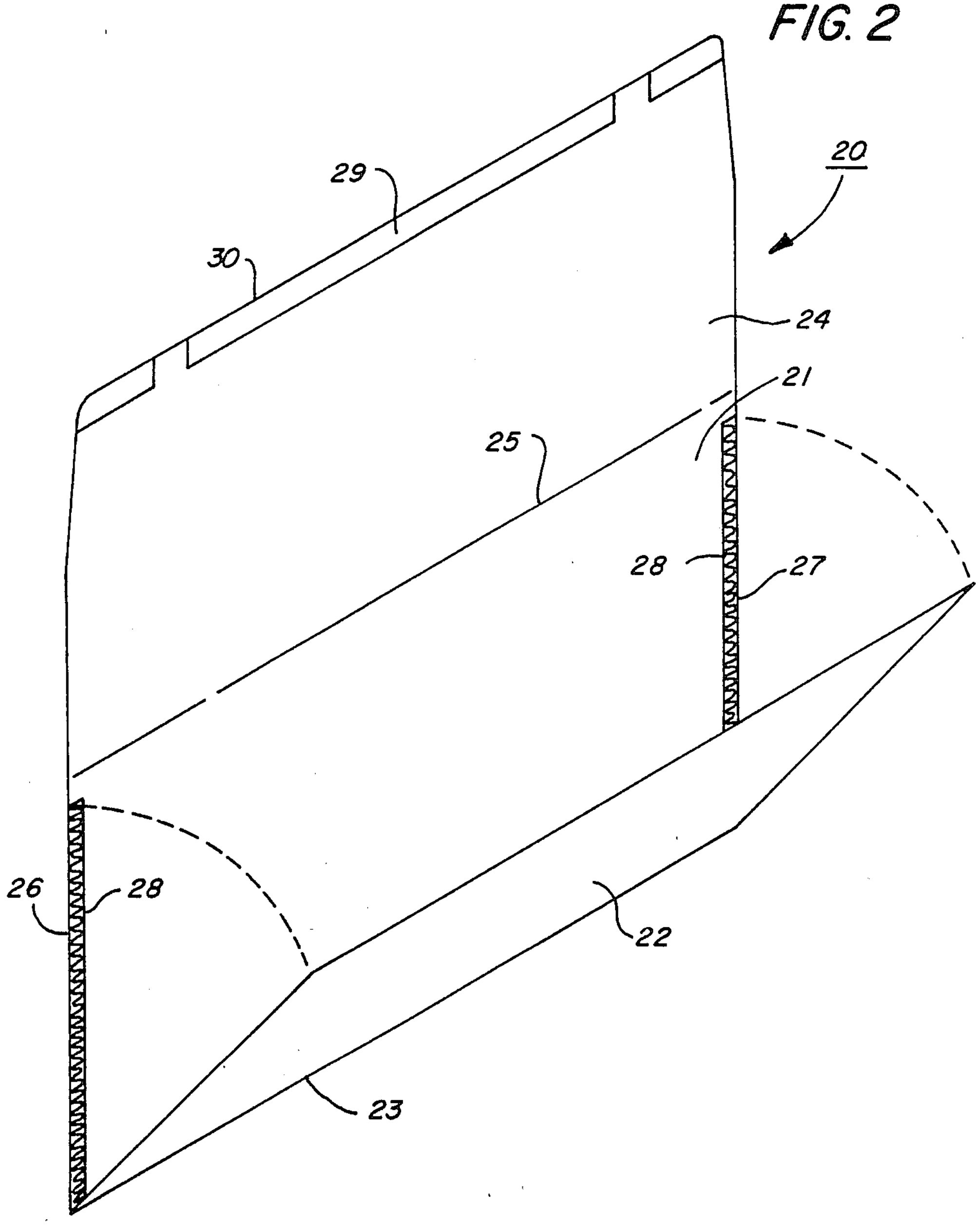
FIG. 2 is an isometric view of an envelope constructed in accordance with the present invention.

As shown in FIGS. 1 and 2, the copier/duplicator system 11 and 12 is typically provided with a copy sheet supply/feeding station 14 at one end of the system. This station may include a main sheet supply 15 having an elevator platform 16 which serves as the support or holding tray for a stack of copy sheets, and an auxiliary tray 17 which may contain additional sheets or other material upon which copies are made. The prcessor also includes a document platen 18 upon which an original may be placed for exposure and copying. The sheet supply/feeding apparatus 14 includes a top sheet feeding device 19 associated with the stack of sheets on the main supply 15 and serves to separate sheets seriatim from the top of the stack and to convey them to the sheet transport system of the processor 11. A catch tray 19 is provided on the output end of the processor for receiving copy sheet output in the conventional manner. Other output devices such as sorters and finishing stations may be provided, but since the present invention contemplates the production of multiple copies of the same item, a simple receptacle is sufficient.

The envelope 20 of the present invention, as shown in FIG. 2, is formed with a front panel 21, a back panel 22, hingedly related thereto along a fold line 23 along the bottom edge of the envelope. At the upper edge of the front panel 21 is a closure flap 24 adapted to be folded along a line 25, which defines the upper edge of the front panel, when the envelope is to be closed and sealed.

The side edges 26, 27 of the front panel are joined to corresponding edges of the back panel by suitable adhesive material 28 applied along the surfaces adjacent and inwardly of the edges, respectively. The side edges are generally perpendicular to the folded edge 23 for the envelope and are parallel to each other. It will be noted that the joined edges comprise only the two layers of the panels and do not include overlapping flaps so that the envelope blank, as shown in FIG. 2, has only a two layer thickness. Adhesive material 29 is also applied to the outer portion of the closure flap 24 which has an outer edge 30 formed parallel to the bottom edge 23 of the envelope. The closure panel fold line 25 is positioned a greater distance from the fold line 23 than the width of the back panel 22, and is formed by a light crease in the material forming the front panel 21, and therefore, does not form an additional thickness to the envelope when the same travels through the processor 11.

Figure 3:
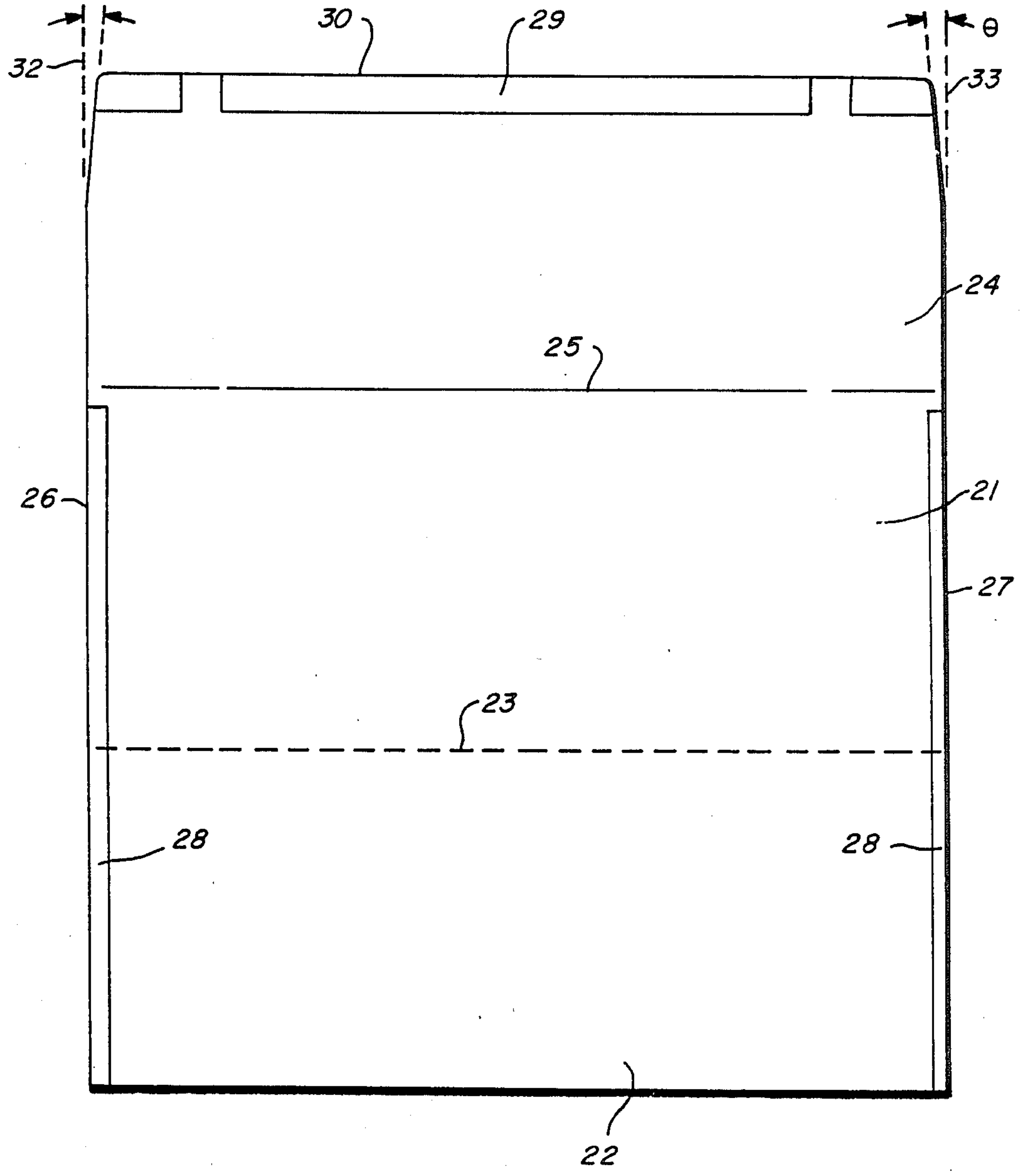
FIG. 3 is a diagrammatic view of the blank from which the envelope is formed.

As shown in FIG. 3, each of the edges 26, 27 extend along a line 32, 33, respectively, along portions of the edges of the closure flap 24. The lines 32 and 33 are straight; that is, generally perpendicular to the fold line 23 as are the edges 26, 27. The distance these lines 32, 33 extend into the flap is greater than half of the width of the flap. Beyond this distance, the flap tapers inwardly very slightly at an angle $\theta$ leaving a very substantial portion of the outer edge 30 as a straight edge parallel to the bottom edge 23.

Figure 4:
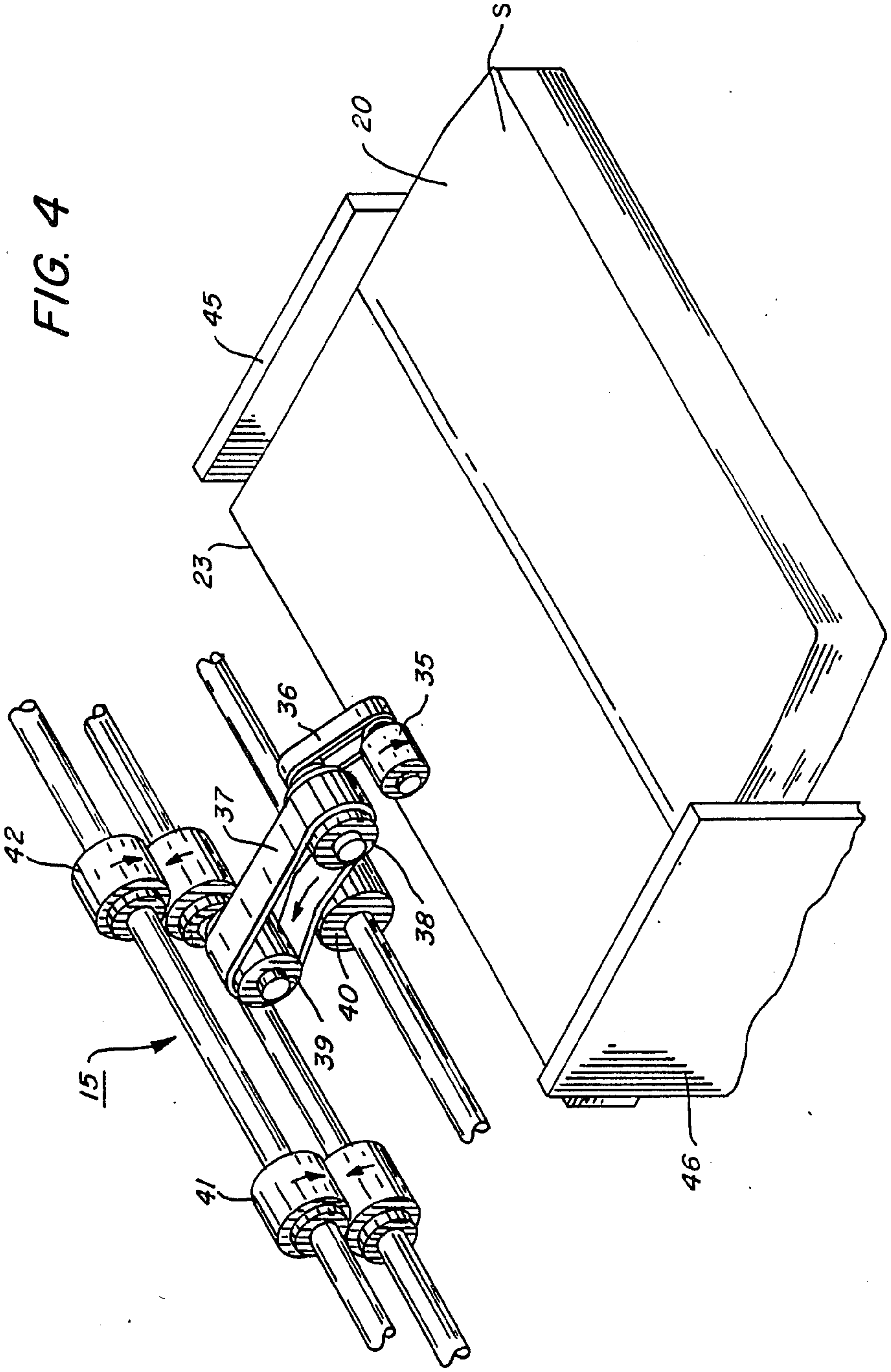
FIG. 4 is an isometric view of a sheet feeding apparatus to which the present invention is applied.
Figure 5:
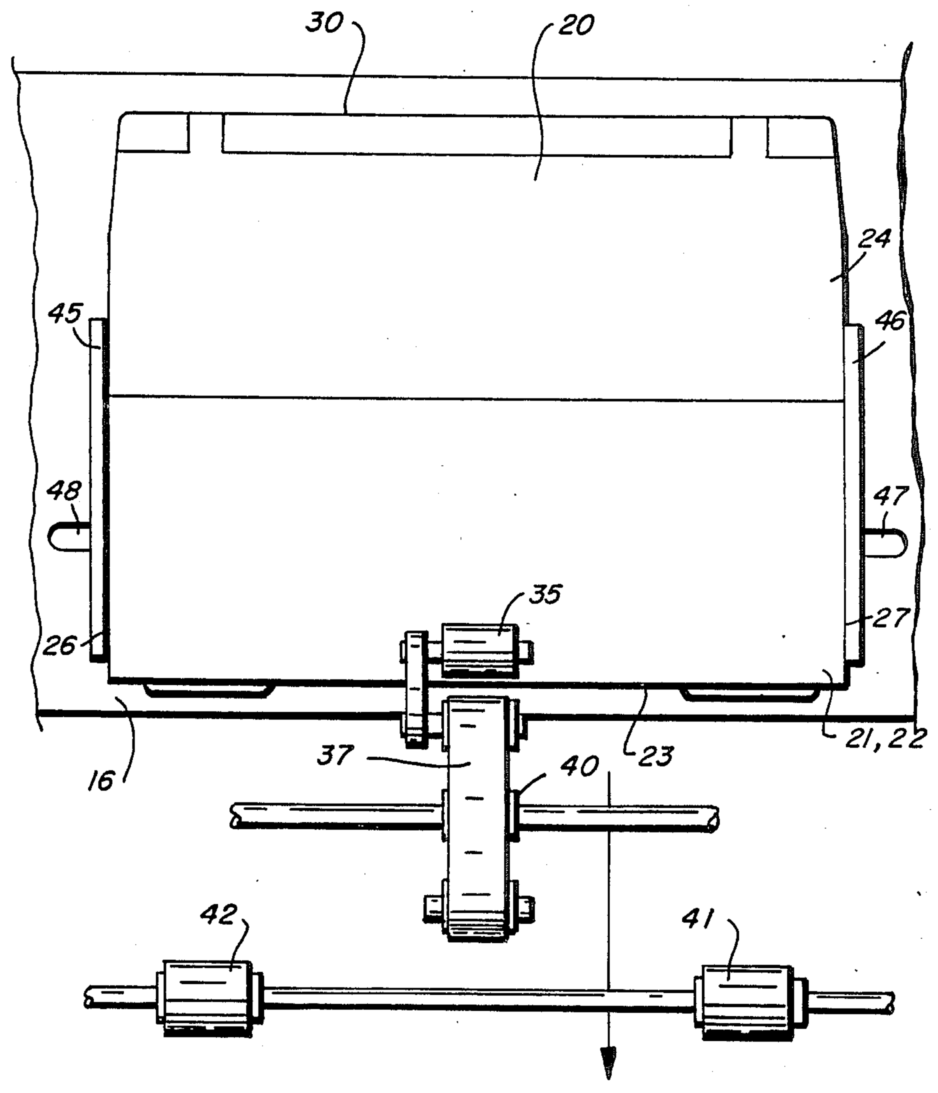
FIG. 5 is a plan view of the apparatus.

Portions of the main sheet supply 15 of the feeding station 14 are shown in FIGS. 4 and 5 with a stack S of envelope blanks 20 placed upon the platform 17, as a direct replacement of copy sheets normally on the platform for conventional copying. As previously stated, the present invention is directed to an envelope designed to be fed from a copy sheet feeding apparatus of a copying machine, and to be accomplished without modifying or adjusting the structure of the apparatus than is conventional regarding copy sheets. Each of the envelope blanks placed on the platform, as previously stated, is formed at a thickness no greater than two layers of the material comprising the same.

The supply 15 comprises a copy sheet separating device having a separating roller 35, which a stack of sheets S are on the platform 16 and elevated to a position for sheet feeding, is adapted to rest upon the top sheet of the stack for feeding thereby. A drive belt 36 connects the roller 35 to a shaft 37 for a sheet retard belt mechanism comprising rollers 38, 39, a feed belt encircling the same, and a retard roller 40. As is known with retard belt systems, for sheet separation, sheets are separated by the roller 35 which forces one or more of the top sheets on the stack S toward the nip between the lower run of the feed belt 37 and the retard roller 40 which extends slightly into the run of the belt to provide a suitable working portion of the periphery of the retard roller. With a few sheets being fanned within the nip, only the top sheet is allowed to go through the nip because of the retard action of the roller 40. This retard action is produced by the respective directional movements of the belt 37 and the roller 40, as indicated by the illustrated arrows.

Suitable drive means are connected to the rollers 35, 38, 39, 40 and the belt 37 by way of the illustrated associated shafts. After leaving the nip between the roller 40 and the belt 37, sheets are directed to roller feed pairs 41, 42 which defines the starting point for the sheet transport system for the processor 11. When the sheet is gripped by the roller pairs 41, 42, the same take over and pull the sheet cut from the influence of the retard mechanism and the sheet separating roller 35.

The sheet supply 15 also includes conventional sheet guides 45, 46 associated with the elevator platform 16 which are manually adjusted to the size, in this case, the length, of copy sheets. The guides 45, 46 are made adjustable toward and away from each other and in unison along slots 47, 48, respectively, and are held fixed by suitable locking devices (not shown). After the operator has placed a stack of envelope blanks on the platform 16, the guides 45, 46 are moved into slight engagement with the adjacent sides 26, 27, respectively, of the stack. Since the guides are movable in either direction in unison, such movement always insures that the stack of whatever size, will be centrally positioned on the platform and relative to the sheet retard mechanism and separating device.

In the present invention, the copy sheets have been replaced by a stack of envelopes constructed as described above. As shown in FIG. 5, the envelope 20 has its bottom folded edge 23 positioned at the leading edge for separation from the stack and feeding into the processor 11. Since the particular copier illustrated and utilized as the host copying machine prints on the bottom face of copy sheets, the envelopes 20 are inverted, that is, the front panel 21 and closure flap 24 are on the bottom.

In operation, as the top envelope is separated from the stack by the roller 35, it projects into the nip of the belt 37 and the retard roller 40 which prevents multiple feed of envelopes. Further movement of the envelope is imparted by the belt 37 until the leading edge 23 is gripped by the roller pairs 41, 42 whereupon continued movement of the envelope is achieved by these rollers. During this entire movement of the envelope from its startup position on the stack S to the time the leading edge thereof is engaged by the rollers 41, 42, the side edges 26, 27 of the envelope are in continuous sliding engagement with the guides 45, 46, respectively. In this manner, the envelope remains in alignment with the direction of travel effected by the sheet separating and retard mechanism. This is accomplished by having the sum of the length of the side edges 26, 27 plus the extensions of the edge of the closure flap 24 along the lines 32, 33 of the edges 26, 27, respectively, equal to or greater than the working distance between the separating roller 35 and the roller pairs 41, 42. During travel through this distance, the envelope remains in guiding contact with the guides 45, 46 so that upon reaching the nips for the roller pairs 45, 46, the envelope is in proper registration for continued transporting through the processor 11 and to receive a toner image thereon in proper registration.

It will be appreciated that with the outer edge 30 of the closure flap 24 being straight for a substantial distance and being formed parallel to the leading edge 23, the envelopes may also be used in sheet feeders which use rear edge sensors and trail edge registration device. In addition, with the side edges 26, 27 parallel and perpendicular to the leading bottom edge 23, the envelopes may also be fed from side and corner registering feeders and transported along a path which has side registration devices.

While the invention has been described to the structure disclosed, it is not confined to the details set forth, but is intended to cover such modifications or changes as may come within the scope of the following claims.

I claim:

1. The combination of an envelope and a copying machine, said copying machine comprising a paper supply feeder, a stack supporting platform, a sheet transport system, a sheet separating device adapted to contact a stack of envelopes to be fed placed on the platform, to separate the envelopes seriatim, and to direct the same to the starting position for the sheet transport system, said envelope comprising front and back panels folded to form and define a bottom edge of the envelope, said bottom edges of the stack of envelopes being arranged to be the leading edges of the stack of envelopes being directed by said sheet separating device to said transport system, said panels having side edges generally perpendicular to said bottom edge and being joined together by side welding with adhesive material applied to the surfaces adjacent and inwardly, respectively, and a closure flap formed as an extension of one of the panels and being defined by side edges which extend between lines projecting from and coincident with the side edges of said one panel, respectively, and for a distance which when added to the length of said side edges of said panels when the envelope is in a flat orientation is equal to or greater than the distance between said sheet separating device and said starting position of said sheet transport system.

2. The envelope of claim 1 wherein said closure flap has its outer edge defined as a straight line for a substantial distance and being generally parallel with said bottom edge.

* * * * *